United States Patent [19]

Massing et al.

[11] Patent Number: 5,321,876
[45] Date of Patent: Jun. 21, 1994

[54] METHOD OF CONVERTING AIRCRAFT BRAKE ASSEMBLIES

[75] Inventors: Lyle E. Massing; Stephen L. Hodge, both of South Bend, Ind.

[73] Assignee: Allied-Signal Inc., Morristown, N.J.

[21] Appl. No.: 988,502

[22] Filed: Dec. 10, 1992

[51] Int. Cl.$^5$ .................... B23P 7/00; F16D 55/36
[52] U.S. Cl. .................... 29/401.1; 29/525.1; 188/71.5
[58] Field of Search .................... 29/401.1, 525.1; 188/71.1, 71.5, 72.4, 196 P, 369

[56] References Cited

U.S. PATENT DOCUMENTS

| | | | |
|---|---|---|---|
| 4,467,513 | 8/1984 | Cline | 29/401.1 |
| 4,673,064 | 6/1987 | Will | 29/401.1 X |
| 4,815,189 | 3/1989 | Ijames et al. | 29/401.1 |
| 4,977,985 | 12/1990 | Wells et al. | 188/71.1 |
| 5,205,382 | 4/1993 | Edmisten | 188/71.5 |
| 5,215,168 | 6/1993 | Guiot et al. | 188/71.5 X |

*Primary Examiner*—Timothy V. Eley
*Attorney, Agent, or Firm*—Larry J. Palguta; Leo H. McCormick; Robert A. Walsh

[57] ABSTRACT

An aircraft brake assembly (10, 100, 200) designed as original equipment to have convertible heat sinks comprises one of a steel heat sink aircraft brake assembly (100, 200) and a carbon-carbon composite heat sink aircraft brake assembly (10). When a carbon-carbon composite heat sink (40) is contained within the brake assembly (10), the piston housing (30) contains a plurality of piston bushing assemblies (32) with bushings (33), pistons (34), and adjuster mechanisms (36). The backing plate (28) of the torque tube (20) has riveted thereto a series of cups or connectors (33) which are received within corresponding openings (29) of a carbon-carbon composite backing plate friction material stator disc (27) to prevent rotation thereof. When the carbon-carbon composite heat sink (40) is converted to a steel heat sink (140, 240), the carbon-carbon composite heat sink (40) is separated from the torque tube (20) and piston housing (30), the connectors (33) removed from the rivets (31) and backing plate (28), and the piston bushing assemblies (32) removed from the piston housing (30). A second group of piston bushing assemblies (132, 232) are inserted within the piston housing (30), the second group of piston bushing assemblies having internal components that are dimensionally different from the first group of piston bushing assemblies (32). Backing plate friction material pads or metallic pads (127, 227) are attached to the backing plate (28) of the torque tube (20) by way of rivets (31) as the steel heat sink (140, 240) is assembled with the torque tube (20) and piston housing (30). The steps are reversed in order to convert the steel heat sink aircraft brake assembly (100, 200) to the carbon-carbon composite heat sink aircraft brake assembly (10).

32 Claims, 3 Drawing Sheets

METHOD OF CONVERTING AIRCRAFT BRAKE ASSEMBLIES

BACKGROUND OF THE INVENTION

The present invention relates generally to aircraft brakes, and in particular to aircraft brake assemblies that are convertible from a first type of heat sink to a second type of heat sink.

Aircraft brakes having a steel heat sink have been utilized for many years. Such brake assemblies commonly include a plurality of steel rotors, a plurality of stators with friction material pads attached thereto, a plurality of friction material pads attached by rivets to the backing plate of a torque tube, and piston bushing assemblies. Steel heat sink aircraft brake assemblies have proven to be economical, reliable, and desirable for aircraft that fly relatively short hauls. Carbon-carbon composite heat sink aircraft brake assemblies have become more prevalent as the size of commercial aircraft has increased. Typically, commercial aircraft flying long distances or long hauls may increase revenue and/or reduce operating costs by utilizing the significant weight benefits offered by a carbon-carbon composite heat sink as compared to a steel heat sink. However, if an aircraft with carbon-carbon composite heat sinks is scheduled to fly a short haul, the use of such heat sinks may not be cost effective. Therefore, given a sufficiently sized wheel cavity it is highly desirable to provide an aircraft brake assembly designed as original equipment to be easily converted from (and compatible with) a first type of heat sink to a second type of heat sink. It is highly desirable that a carbon-carbon composite heat sink of an aircraft brake assembly be easily converted to a steel heat sink, and vice versa. This would provide significant advantages over converting or retrofitting an existing brake assembly from a carbon-carbon composite heat sink to a steel heat sink which could result in a heavier steel aircraft brake assembly than a brake assembly designed originally to be only a steel aircraft brake assembly. Converting an existing carbon-carbon composite heat sink aircraft brake assembly to one having a steel heat sink can result in a brake assembly having an overly large torque tube and/or pistons that result in unnecessary weight. Too much weight can result in difficulties with retracting the landing gear. With the present invention, an airline would be able to order a group or fleet of aircraft suitable for both long and short hauls, with the long haul aircraft utilizing carbon-carbon composite heat sink aircraft brake assemblies while the short haul aircraft utilize the more economical steel heat sink aircraft brake assemblies. Should changes in scheduling occur or certain planes be needed for longer or shorter hauls, the particular type of heat sink utilized in the brake assemblies can be converted easily to a different type of heat sink.

SUMMARY OF THE INVENTION

The present invention provides solutions to the above problems by providing a method of converting an aircraft brake assembly designed as original equipment to be convertible from a first heat sink to a second heat sink having different friction material, the aircraft brake assembly able to be connected with a surrounding wheel via rotors of the heat sinks, each heat sink including a pressure disc, rotors, stators, and backing plate pad means, the brake assembly comprising the first heat sink, a torque tube connected with the stators of the first heat sink and including a backing plate with a first set of connectors coupled with the backing plate pad means, and a piston housing having a first set of removable piston bushing assemblies, comprising the steps of:

disassembly the piston housing, first heat sink and torque tube, the piston bushing assemblies from the piston housing, and the connectors from said backing plate, and assembling a second set of piston bushing assemblies with said piston housing, a second set of connectors with the backing plate, and the second heat sink of different friction material with the torque tube and piston housing.

BRIEF DESCRIPTION OF THE DRAWINGS

One way of carrying out the invention is described in detail below with reference to the drawings which illustrate an embodiment in which.

DETAILED DESCRIPTION OF THE INVENTION

Figure 1:
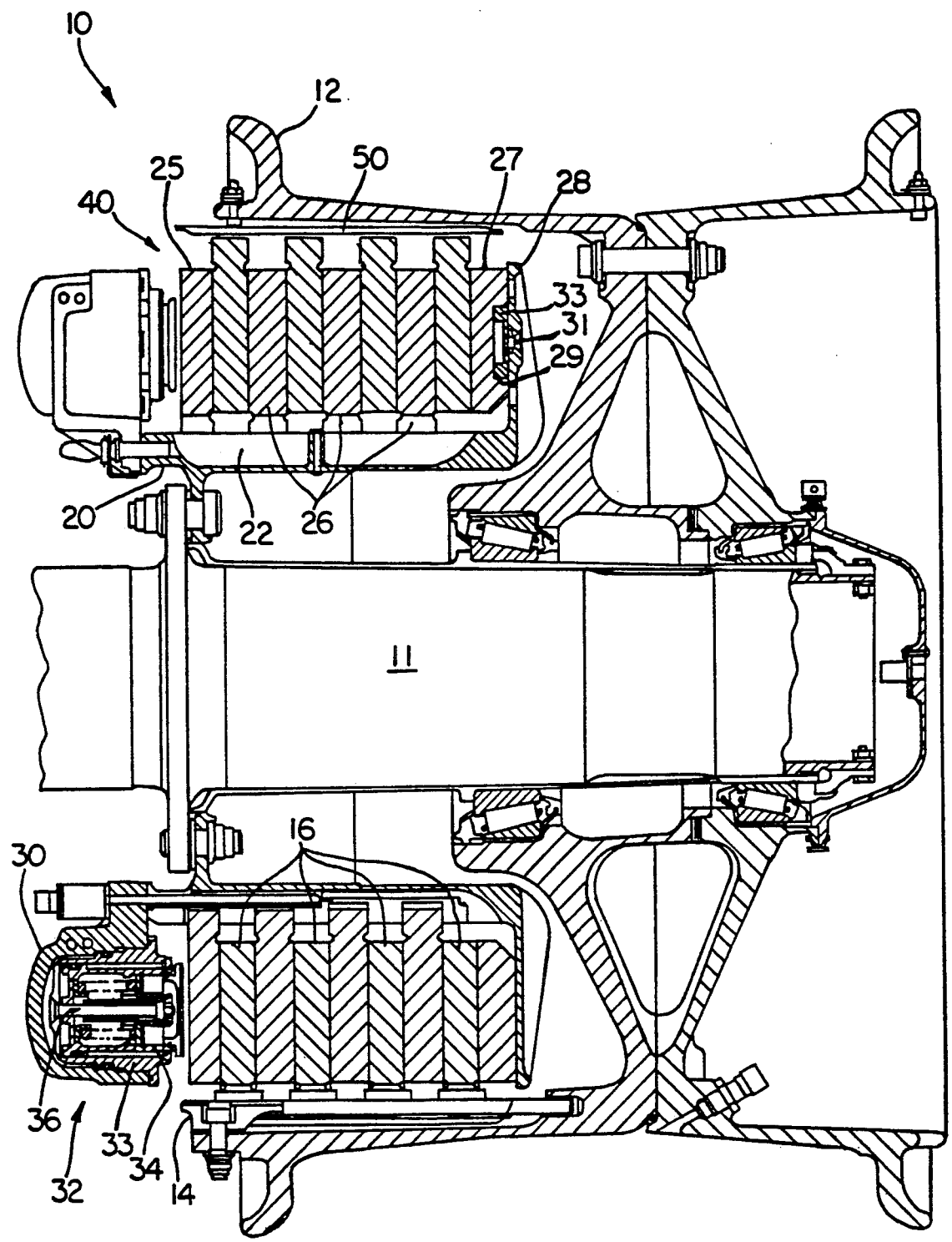
FIG. 1 is an illustration of a carbon-carbon composite heat sink aircraft brake assembly.

FIG. 1 illustrates a carbon-carbon composite heat sink aircraft brake assembly designated generally by reference numeral 10. Brake assembly 10 comprises carbon-carbon composite rotor discs 16 engaging rotor drive key means 14 (which can be integral with wheel 12) that are attached to wheel 12. Torque tube 20 is anchored to the aircraft (it may be connected with axle 11) and includes splines or attachment means 22 engaging carbon-carbon composite stator discs 26. Torque tube 20 includes backing plate 28 having a plurality of cups or connectors 33 affixed thereto by means of rivets 31. Generally, backing plate 28 is annular shaped and attached thereto in a circular configuration is the plurality of cups 33. Each cup is received within an opening 29 of carbon-carbon composite backing plate friction material or stator disc 27 in order to couple nonrotatably the disc 27 with backing plate 28. Piston housing 30 includes therein a plurality of piston bushing assemblies 32 having, generally, bushings 33, pistons 34, and adjuster mechanisms 36. The plurality of piston bushing assemblies 32 are disposed about piston housing 30 for engagement with the adjacent carbon-carbon composite pressure disc 25 comprising an auxiliary stator disc. The brake assembly comprises the carbon-carbon composite heat sink 40 (stators 25, 26, 27 and rotors 16 are designated generally by reference numeral 40 which identifies a carbon brake heat sink) and includes further the torque tube 20 with backing 28 and connectors 33/rivets 31, and piston housing 30 with piston bushing assemblies 32. The wheel typically includes heat shield 50 and rotor drive keys 14 which may be changed when the brake assembly is converted from one type of heat sink to another but it is contemplated that the present invention also may be practiced without changing these components.

Figure 2:
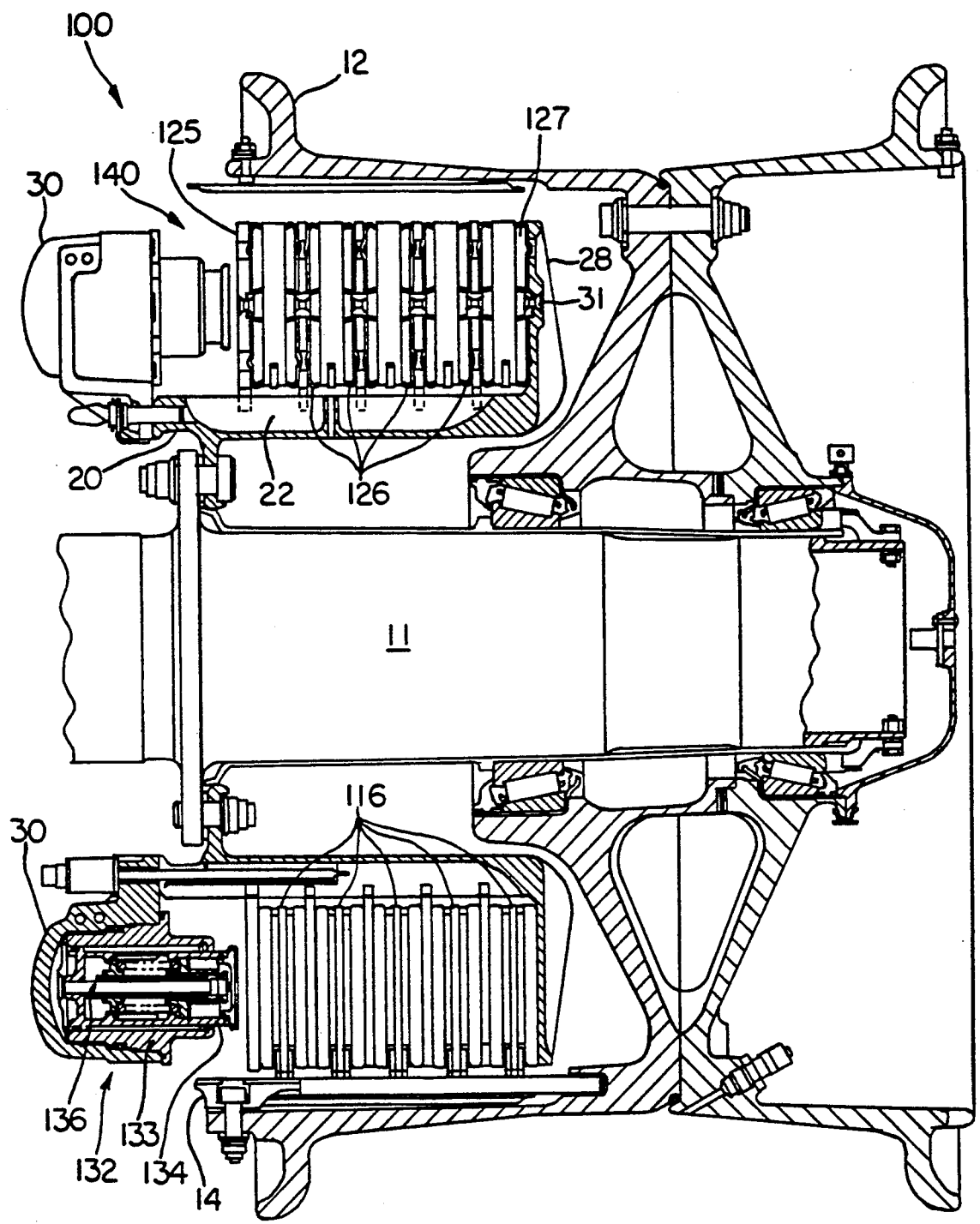
FIG. 2 is an illustration of a steel heat sink aircraft brake assembly.

Referring to FIG. 2, a steel heat sink aircraft brake assembly is designated generally by reference numeral 100 and comprises a plurality of drive key means 14 (which can be integral with wheel 12) engaging a plurality of steel heat sink rotor discs 116. Torque tube 20 is anchored to the aircraft (it may be connected with axle 11) and includes splines or attachment means 22 which engage a plurality of stator discs 126 each having friction material pads attached thereto. Torque tube 20 includes backing plate 28 having fixed thereto, by means of rivets 31, a plurality of friction material pads 127 which are attached or coupled positively to backing plate 28 via rivets 31. Piston housing 30 includes a plurality of piston bushing assemblies 132 having, generally, bushings 133, pistons 134, and adjuster mechanisms 136. Piston bushing assemblies 132 are dimensionally different from piston bushing assemblies 32 of carbon-carbon composite heat sink aircraft brake assembly 10, except for the outer diameter threads of the bushings. Brake assembly 100 comprises the steel heat sink 140 (stators 125, 126, friction material pads 127, and rotors 116 are designated generally by reference numeral 140 which identifies a steel brake heat sink) and further includes the torque tube 20 with backing plate 28 and rivets 31, and piston housing 30 with bushing assemblies 132.

When it is desired to convert the brake assembly from a first type of heat sink to a second type of heat sink, or vice versa, the following example method may be utilized. The example discloses the conversion of the carbon-carbon composite heat sink aircraft brake assembly 10 to the steel heat sink aircraft brake assembly 100 (the brake assemblies designed as original equipment that is easily convertible), and the same steps would be utilized in reverse for converting the steel heat sink aircraft brake assembly 100 to the carbon-carbon composite heat sink aircraft brake assembly 10. Typically, carbon-carbon composite heat sink aircraft brake assembly 10 of FIG. 1 is already disassembled from axle 11 and surrounding wheel 12. First, piston housing 30 is disassembled from torque tube 20 and carbon-carbon composite heat sink 40 removed from the torque tube. Cups or connectors 33 are disassembled from rivets 31 so that cups 33 are removed from backing plate 28, and piston bushing assemblies 32 are threadedly removed from piston housing 30. The bushings 133 of steel brake piston bushing assemblies 132 have identical outer diameter threads to that of the bushings 33 of carbon brake piston bushing assemblies 32, and are threadedly inserted in piston housing 30 along with associated steel brake pistons 134 and adjuster mechanisms 136. Although the bushings 133 of piston bushing assemblies 132 have outer diameter threads identical to that of the bushings 33 of piston bushing assemblies 32, the piston bushing assemblies for steel and carbon brakes are dimensionally different from one another in regard to their internal components. During reassembly, a plurality of friction material pads 127 are secured fixedly to backing plate 28 of torque tube 20 by means of new rivets 31. The remainder of steel heat sink 140 is assembled on torque tube 20 and piston housing 30 attached to torque tube 20.

As an option, drive key means 14 (should wheel 12 have detachable drive key means 14) and/or heat shield 50 may be changed to drive key means and/or a heat shield particularly suitable for a steel heat sink aircraft brake assembly.

If a steel heat sink aircraft brake assembly with a sufficiently sized wheel cavity is to be converted to a carbon-carbon composite heat sink aircraft brake assembly, the piston bushing assemblies are removed and replaced by piston bushing assemblies that are dimensionally different as to the internal components, while pads 127 are decoupled from backing plate 28 by means of removing rivets 31 and then cups 33 are attached to backing plate 28 by means of new rivets 31, before the carbon-carbon composite heat sink 40 is assembled with piston housing 30 and torque tube 20. As disclosed above, as an option the detachable drive key means 14 and heat shield 50 may be changed to drive key means and a heat shield particularly suitable for a carbon-carbon composite heat sink aircraft brake assembly.

Figure 3:
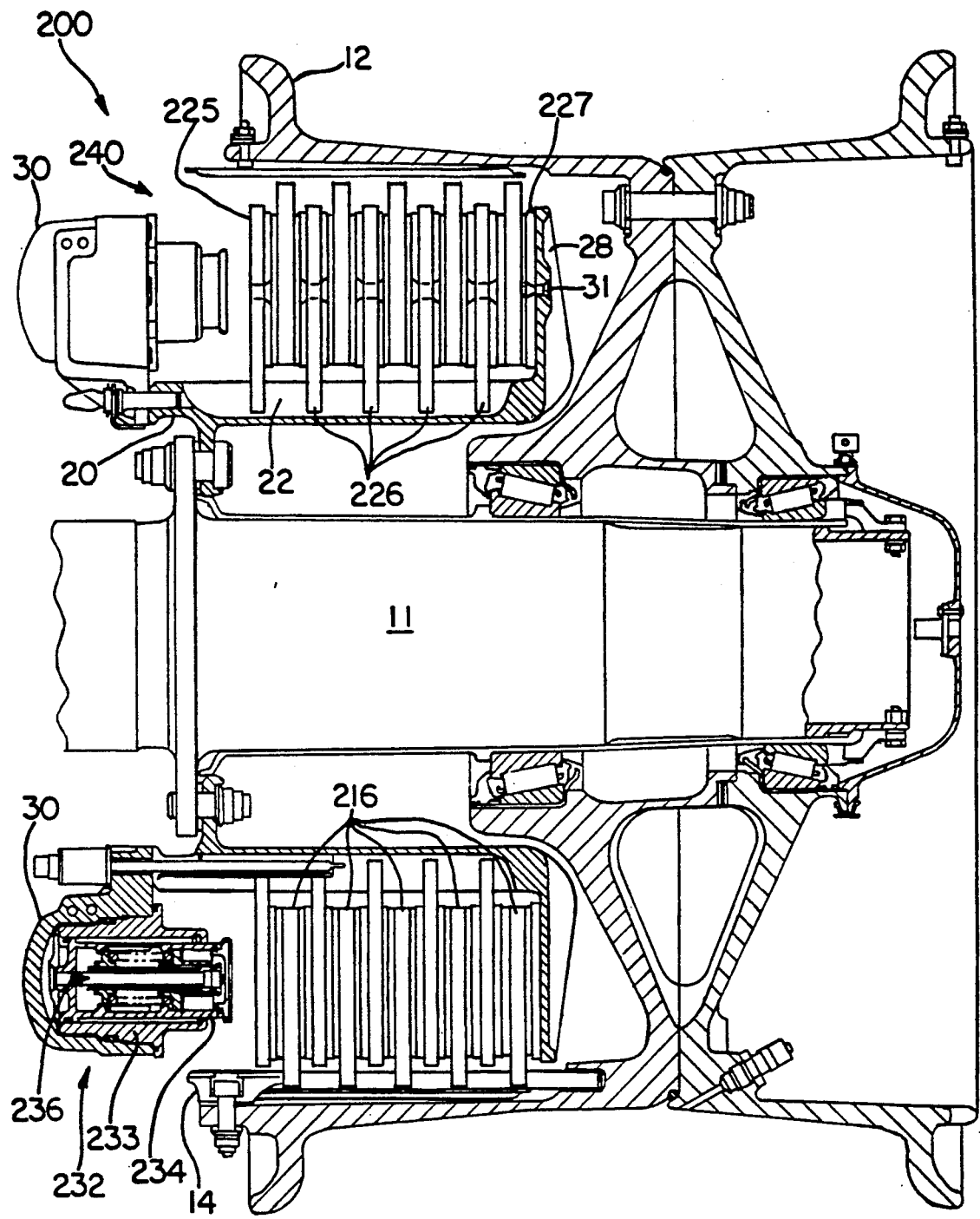
FIG. 3 is an illustration of another steel heat sink aircraft brake assembly.

Referring to FIG. 3, another steel heat sink aircraft brake assembly is designated generally by reference numeral 200 and comprises a plurality of drive key means 14 (which can be integral with wheel 12) engaging a plurality of steel heat sink rotor discs 216 having friction material or linings attached or bonded thereto. Torque tube 20 is anchored to the aircraft (it may be connected with axle 11) and includes splines or attachment means 22 which engage a plurality of stator discs 226 each having metallic pads attached thereto by rivets. In aircraft brake 200, the friction material or linings are located on the rotor discs 216 rather than on the stator discs 226 which include the metallic pads. Torque tube 20 includes backing plate 28 having fixed thereto, by means of rivets 31, a plurality of metallic pads 227 which are attached or coupled positively to backing plate 28 via rivets 31. Piston housing 30 includes a plurality of piston bushing assemblies 232 having, generally, bushings 233, pistons 234, and adjuster mechanisms 236. Piston bushing assemblies 232 are dimensionally different from piston bushing assemblies 32 of carbon-carbon composite heat sink aircraft brake assembly 10, except for the outer diameter threads of the bushings. Brake assembly 200 comprises a steel heat sink 240 (stators 225, 226, metallic pads 227, and rotors 216 are designated generally by reference numeral 240 which identifies a steel brake heat sink) and further includes the torque tube 20 with backing plate 28 and rivets 31, and piston housing 30 with bushing assemblies 232.

When it is desired to convert the brake assembly from a first type of heat sink to a second type of heat sink, or vice versa, the following example method may be utilized. The example disclosed is the conversion of the carbon-carbon composite heat sink aircraft brake assembly 10 to the steel heat sink aircraft brake assembly 200 (the brake assemblies designed as original equipment that is easily convertible), and the same steps would be utilized in reverse for converting the steel heat sink aircraft brake assembly 200 to the carbon-carbon composite heat sink aircraft brake assembly 10. Typically, carbon-carbon composite heat sink aircraft brake assembly 10 of FIG. 1 is already disassembled from axle 11 and surrounding wheel 12. First, piston housing 30 is disassembled from torque tube 20 and carbon-carbon composite heat sink 40 removed from the torque tube. Cups or connectors 33 are disassembled from rivets 31 so that cups 33 are removed from backing plate 28, and piston bushing assemblies 32 are threadedly removed from piston housing 30. The bushings 233 of steel brake piston bushing assemblies 232 have identical outer threads to that of bushings 33 of carbon brake piston bushing assemblies 32, and are threadedly inserted in piston housing 30 along with associated steel brake pistons 234 and adjuster mechanisms 236. Although the bushings 233 of piston bushing assemblies 232 have outer diameter threads identical to that of bushings 33 of piston bushing assemblies 32, the piston bushing assemblies for steel and carbon brakes are dimensionally different from one another in regard to their internal components. During reassembly, a plurality of metallic pads 227 are secured fixedly to backing plate 28 of torque tube 20 by means of new rivets 31. The remainder of steel heat sink 240 is assembled on torque tube 20 and piston housing 30 attached to torque tube 20.

As an option, drive key means 14 (should wheel 12 have detachable drive key means 14) and/or heat shield 50 illustrated in FIG. 1 may be changed to drive key means and/or a heat shield particularly suitable for a steel heat sink aircraft brake assembly.

If the steel heat sink aircraft brake assembly of FIG. 3 is to be converted to a carbon-carbon composite heat sink aircraft brake assembly, the piston bushing assemblies are removed and replaced by piston bushing assemblies that are dimensionally different as to the internal components, while metallic pads 227 are decoupled from backing plate 28 by means of removing rivets 31 and then cups 33 are attached to backing plate 28 by means of new rivets 31, before the carbon-carbon composite heat sink 40 is assembled with piston housing 30 and torque tube 20. As an option, detachable drive key means 14 and/or heat shield 50 illustrated in FIG. 3 may be changed to drive key means and/or a heat shield particularly suitable for a carbon-carbon composite heat sink aircraft brake assembly.

The present invention provides a method for converting an aircraft brake assembly designed as original equipment to be convertible from a first type of heat sink to a second type of heat sink, with minimal changes in component parts. Should an airline purchase a group of aircraft which are to be utilized for different length flights, the long haul designated aircraft can utilize carbon-carbon composite heat sink aircraft brake assemblies which are more economical for such flights, while the short haul designated aircraft can use steel heat sink aircraft brake assemblies which are economical for short hauls. Should flight scheduling change or the airline decide to change some aircraft from one designated group to the other designated group, the particular type of heat sink can be converted easily to the other type of heat sink and enable the airline to optimize operating costs.

We claim:

1. A method of converting an aircraft brake assembly designed as original equipment to be convertible from a first heat sink of one of carbon and steel brake assemblies to a second heat sink of the other of carbon and steel brake assemblies and having different friction material, the aircraft brake assembly able to be connected with a surrounding wheel via rotors of the respective heat sink, each heat sink including a pressure disc, rotors, stators, and a backing plate friction material, the brake assembly comprising the first heat sink, a torque tube connected with the stators of the first heat sink and including a backing plate with a first set of connectors coupled with the backing plate friction material, and a piston housing having a first set of removable piston bushing assemblies, comprising the steps of:

disassembling the piston housing, first heat sink and torque tube, the piston bushing assemblies from the piston housing, and the connectors from said backing plate, and assembling a second set of piston bushing assemblies with said piston housing, a second set of connectors with the backing plate, and the second heat sink of different friction material with the torque tube and piston housing.

2. The method in accordance with claim 1, wherein the first heat sink comprises a carbon-carbon composite heat sink and the second heat sink comprises a steel heat sink.

3. The method in accordance with claim 2, wherein the first set of connectors is attached by means of rivets to the backing plate and received within corresponding openings of the backing plate friction material to restrain rotation thereof.

4. The method in accordance with claim 3, wherein the first set of piston bushing assemblies comprises internal components dimensionally different from internal components of the second set of piston bushing assemblies.

5. The method in accordance with claim 1, wherein the second heat sink comprises a steel heat sink and the second set of connectors comprises rivets that attach fixedly the backing plate friction material to the backing plate to effect a positive attachment.

6. The method in accordance with claim 1, wherein the first heat sink comprises a steel heat sink and the second heat sink comprises a carbon-carbon composite heat sink.

7. The method in accordance with claim 6, wherein the backing plate friction material of the first heat sink is coupled fixedly with the backing plate by means of the first set of connectors which comprises rivets that effect a positive attachment of the backing plate friction material to the backing plate.

8. The method in accordance, with claim 7, wherein the second set of connectors is attached by means of rivets to the backing plate and received within corresponding openings of the backing plate friction material to restrain rotation thereof.

9. The method in accordance with claim 1, wherein the wheel includes a first set of rotor drive key means removable from said wheel, and further comprising the steps of removing the first set of rotor drive key means and assembling a second set of rotor drive key means with said wheel.

10. The method in accordance with claim 1, wherein the wheel includes first heat shield means disposed about the first heat sink, and further comprising the steps of removing the first heat shield means and assembling second heat shield means about the second heat sink.

11. A method of converting an aircraft brake assembly designed as original equipment to be convertible from a carbon brake heat sink to a steel brake heat sink having different friction material, the aircraft brake assembly able to be connected with a surrounding wheel by rotors of the respective heat sink, each heat sink including a pressure disc, rotors, stators, and backing plate friction material, the brake assembly comprising the carbon brake heat sink which comprises carbon-carbon composite rotors, stators, pressure disc, and a carbon-carbon composite backing plate friction material disc, a torque tube connected with the stators of the first heat sink and including a backing plate with a first set of connectors coupled with the backing plate friction material disc, and a piston housing having a first set of removable piston bushing assemblies, and comprising the steps of:

disassembling the piston housing, carbon brake heat sink and torque tube, the piston bushing assemblies from the piston housing, and the connectors from said backing plate, and assembling a second set of piston bushing assemblies with said piston housing, a second set of connectors with the backing plate, and the steel brake heat sink of different friction material with the torque tube and piston housing.

12. The method in accordance with claim 11, wherein the first set of connectors is attached by means of rivets to the backing plate and received within corresponding openings of the backing plate friction material disc to restrain rotation thereof.

13. The method in accordance with claim 12, wherein the first set of piston bushing assemblies comprises internal components dimensionally different from internal components of the second set of piston bushing assemblies.

14. The method in accordance with claim 11, wherein the wheel includes a first set of rotor drive key means removable from said wheel, and further comprising the steps of removing the first set of rotor drive key means and assembling a second set of rotor drive key means with said wheel.

15. A method of converting an aircraft brake assembly designed as original equipment to be convertible from a steel brake heat sink to a carbon brake heat sink having different friction material, the aircraft brake assembly able to be connected with a surrounding wheel by rotors of the respective heat sink, each heat sink including a pressure disc, rotors, stators, and backing plate friction material, the brake assembly comprising the steel brake heat sink which comprises a heat sink having the pressure disc, stators, rotors, and backing plate friction material pads, a torque tube connected with the stators of the steel brake heat sink and including a backing plate with a first set of connectors coupled with the backing plate friction material pads, and a piston housing having a first set of removable piston bushings, comprising the steps of:

disassembling the piston housing, steel brake heat sink and torque tube and including disconnecting the connectors and friction material pads from said backing plate, and the piston bushing assemblies from the piston housing, and assembling a second set of piston bushing assemblies with said piston housing, a second set of connectors with the backing plate, and the carbon brake heat sink of different friction material with the torque tube and piston housing.

16. The method in accordance with claim 15, wherein the carbon brake heat sink comprises a carbon-carbon composite heat sink.

17. The method in accordance with claim 16, wherein the second set of connectors is attached by means of rivets to the backing plate and received within corresponding openings of the backing plate friction material to restrain rotation thereof.

18. The method in accordance with claim 17, wherein the second set of piston bushing assemblies comprises internal components dimensionally different from internal components in the first set of piston bushing assemblies.

19. The method in accordance with claim 15, wherein the first set of connectors comprises rivets that attach the backing plate friction material pads to the backing plate to effect a positive attachment therebetween.

20. The method in accordance with claim 15, wherein the wheel includes a first set of rotor drive key means removable from said wheel, and further comprising the steps of removing the first set of rotor drive key means and assembling a second set of rotor drive key means with said wheel.

21. A method of converting an aircraft brake assembly designed as original equipment to be convertible from a first heat sink of one of carbon and steel brake assemblies to a second heat sink of the other of carbon and steel brake assemblies and having different friction material, the aircraft brake assembly able to be connected with a surrounding wheel via rotors of the respective heat sink, each heat sink including a pressure disc, rotors, stators, and backing plate pad means, the brake assembly comprising the first heat sink, a torque tube connected with the stators of the first heat sink and including a backing plate with a first set of connectors coupled with the backing plate pad means, and a piston housing having a first set of removable piston bushing assemblies, comprising the steps of:

disassembling the piston housing, first heat sink and torque tube, the piston bushing assemblies from the piston housing, and the connectors from said backing plate, and assembling a second set of piston bushing assemblies with said piston housing, a second set of connectors with the backing plate, and the second heat sink of different friction material with the torque tube and piston housing.

22. The method in accordance with claim 21, wherein the first heat sink comprises a carbon-carbon composite heat sink and the second heat sink comprises a steel heat sink.

23. The method in accordance with claim 22, wherein the first set of connectors is attached by means of rivets to the backing plate and received within corresponding openings of the backing plate pad means to restrain rotation thereof, the backing plate pad means comprising a generally annular carbon-carbon composite friction material disc.

24. The method in accordance with claim 23, wherein the first set of piston bushing assemblies comprises internal components dimensionally different from internal components of the second set of piston bushing assemblies.

25. The method in accordance with claim 21, wherein the second heat sink comprises a steel heat sink and the second set of connectors comprises rivets that attach fixedly the backing plate pad means to the backing plate to effect a positive attachment, the backing plate pad means comprising a plurality of metallic pads.

26. The method in accordance with claim 21, wherein the first heat sink comprises a steel heat sink and the second heat sink comprises a carbon-carbon composite heat sink.

27. The method in accordance with claim 26, wherein the backing plate pad means of the first heat sink is coupled fixedly with the backing plate by means of the first set of connectors which comprises rivets that effect a positive attachment of the backing plate pad means to the backing plate, the backing plate pad means comprising a plurality of metallic pads.

28. The method in accordance with claim 27, wherein the second set of connectors is attached by means of rivets to the backing plate and received within corresponding openings of the backing plate pad means to restrain rotation thereof, the backing plate pad means comprising a generally annular shaped carbon-carbon composite friction material disc.

29. The method in accordance with claim 21, wherein the wheel includes a first set of rotor drive key means removable from said wheel, and further comprising the steps of removing the first set of rotor drive key means and assembling a second set of rotor drive key means with said wheel.

30. The method in accordance with claim 21, wherein the wheel includes first heat shield means disposed about the first heat sink, and further comprising the steps of removing the first heat shield means and assembling second heat shield means about the second heat sink.

31. The method in accordance with claim 21, wherein the backing plate pad means comprises backing plate friction material.

32. The method in accordance with claim 31, wherein the backing plate friction material comprises one of a disc and a plurality of pads.

* * * * *